United States Patent [19]

Medbury

[11] Patent Number: 4,512,890
[45] Date of Patent: Apr. 23, 1985

[54] MEANS FOR THE SORPTION OF A PETROLEUM PRODUCT FROM A LIQUID

[76] Inventor: Seward J. Medbury, 28785 Oak Point, Farmington Hills, Mich. 48018

[21] Appl. No.: 557,863

[22] Filed: Dec. 5, 1983

[51] Int. Cl.³ .............................................. B01D 29/06
[52] U.S. Cl. .................................. 210/335; 210/341; 210/418; 210/435; 210/494.1
[58] Field of Search ............... 210/680, 691, 799, 335, 210/340, 341, 400, 401, 924, 671, 418, 435, 437, 457, 483, 484, 494.1, 499, 502.1, 506–508; 428/6

[56] References Cited

U.S. PATENT DOCUMENTS

| | | | |
|---|---|---|---|
| 2,365,502 | 12/1944 | Weesner | 428/6 |
| 2,387,714 | 10/1945 | Briggs | 210/680 |
| 3,193,100 | 7/1965 | Broughton | 210/340 |
| 3,494,863 | 2/1970 | Greenman | 210/680 |
| 3,617,555 | 11/1971 | Ginsburgh et al. | 210/671 |
| 3,668,118 | 6/1972 | Rhodes | 210/671 |
| 3,804,257 | 4/1974 | Sommermeyer | 210/335 |
| 4,061,569 | 12/1977 | Bennett et al. | 210/924 |
| 4,439,324 | 3/1984 | Crotti | 210/691 |

OTHER PUBLICATIONS

Sittig, M. *Oil Spill Prevention and Removal Handbook*, Noyes Data Corp., 1974, p. 392.

*Primary Examiner*—Ivars Cintins
*Attorney, Agent, or Firm*—Brooks & Kushman

[57] ABSTRACT

A filter including a flexible plastic mesh having feathers adhesively attached thereto on opposite sides thereof is disclosed for separating out oil from an oily liquid. The filter comprises an oil sorption element of a filtering device which houses the filter. A filtering system comprises a plurality of interconnected filtering devices which may be arranged in parallel or in series with each other. Control valves are provided for controlling the flow of the oily liquid to the filtering devices. A filter assembly, including a plurality of filters supported by a movable conveyor in spaced relationship, is also disclosed.

6 Claims, 7 Drawing Figures

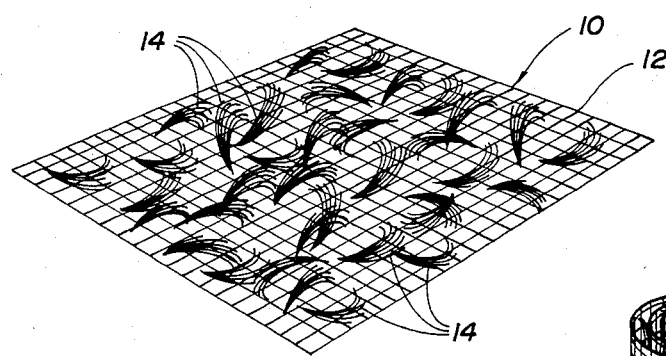
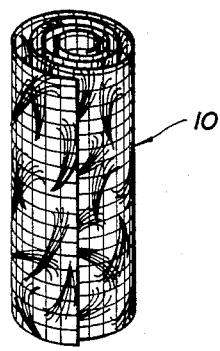
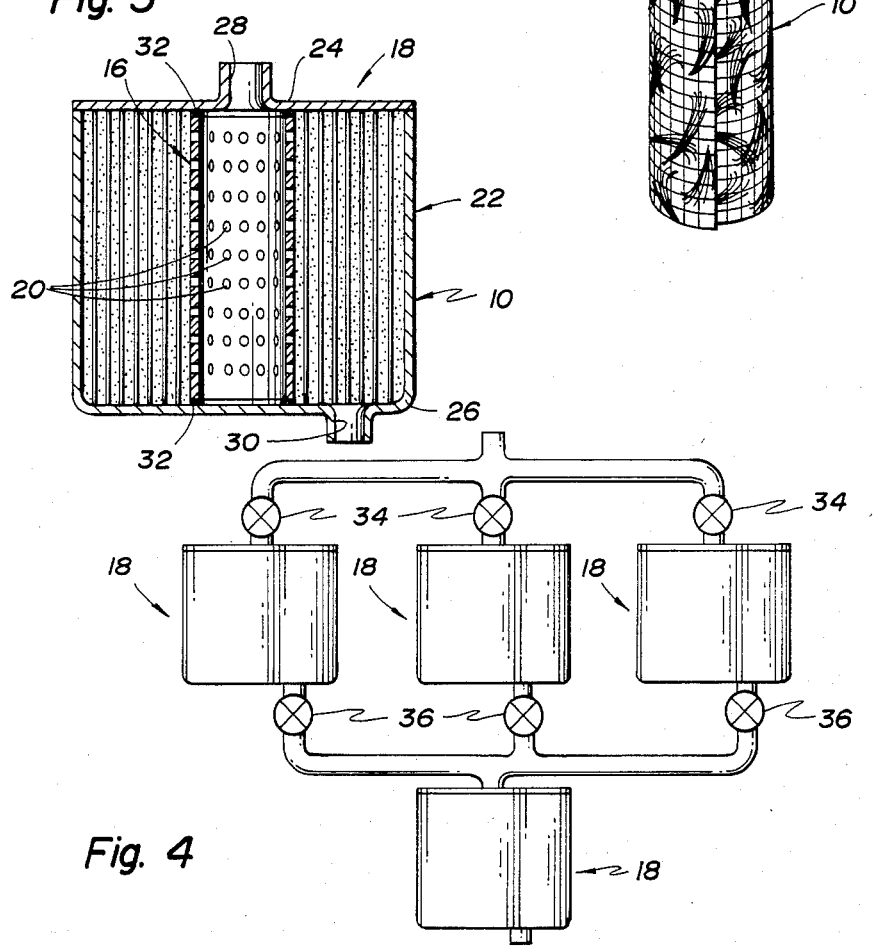

MEANS FOR THE SORPTION OF A PETROLEUM PRODUCT FROM A LIQUID

TECHNICAL FIELD

This invention relates to the removal of oil and oil-like products from a liquid and, in particular, to the removal of oil and oil-like products from a liquid by means of sorption.

BACKGROUND ART

The difficulty in separating oil or oil-like products from oily liquids has generated several approaches to solve the problem. The problem is particularly troublesome with respect to removal of oil spills from water, especially turbulent water. One approach is to employ skimming devices and processes. One problem with this method as that water is often skimmed off with the separated oil, thereby necessitating further treatment.

Another method of separating the oil from the water is through the use of a sorbent. There are two types of sorbent materials, absorbents and adsorbents. Absorbents soak up oil whereas adsorbents provide a surface for the oil particles to cling to.

Sorbents may be divided into three general classes: (1) natural products, (2) modified or chemically treated natural products, and (3) synthetic or man-made products. U.S. patent to Sohl U.S. Pat. No. Re. 31,087 discloses a fibrous web which comprises a plurality of entangled oleophilic fibers. The fibers are hydrophobic in the presence of oil. The web comprises a plastic, such as nylon or polypropylene, having a large number of interconnected, interstitial spaces for reception and retention of oil to the exclusion of water.

Sorbents of a natural origin may be derived from a mineral source, which may include various clays and other micas and perlite and mixtures thereof. Examples of such sorbents are disclosed in the U.S. patents to Preus U.S. Pat. No. 4,111,813 and Weiler U.S. Pat. No. 3,527,701.

Other sorbents of a natural origin may be derived from vegetative sources, such as bark, as disclosed in the U.S. patent to Fahlvik U.S. Pat. No. 3,617,565. Wood pulp which has been chemically treated is disclosed as a sorbent in the U.S. patent to Field et al U.S. Pat. No. 4,343,680. A fibrous sorbent material, such as hemp, is disclosed in the U.S. patent to Armaly U.S. Pat. No. 2,399,158.

Some sorbents of a natural origin are derived from animal sources as disclosed in the U.S. patent to Schwartzwalder et al U.S. Pat. No. 3,219,194 (i.e. wood) and in the book "Oil Spill Prevention and Removal Handbook", pages 392 through 393, (i.e. feathers) published by the Noyes Data Corporation in 1974.

The use of such sorbent materials by themselves, however, have failed to provide a workable system in removing oil from water. Also, there are relatively high labor costs associated with the acquisition, transportation, stockpiling, deployment, distribution on and working into an oil slick, as well as retrieval and ultimate disposal thereof. Furthermore, such sorbent materials are typically only manually retrievable and only then under calm water conditions. Such products also interfere with equipment which physically removes the oil by clogging such skimming and suction devices. Such sorbent materials may also present a pollution problem on disposal. Many of such sorbent materials also ultimately sink, thereby limiting their usefulness.

Other prior art patents which are generally concerned with the problems addressed by the present invention include the U.S. patents to Jakubek U.S. Pat. No. 3,836,000, Grutsch et al U.S. Pat. No. 3,608,727 and Hiler U.S. Pat. No. 2,768,913.

DISCLOSURE OF THE INVENTION

An object of the present invention is to provide a low cost filter including a plurality of feathers attached to a layer of sheet material wherein the filter is not only oleophilic but also hydrophobic.

Another object of the present invention is to provide a filter and a filtering device for separating out oil from an oily liquid including a plurality of feathers attached to a layer of sheet material wherein the filter, and, in particular, the feathers of the filter are not only adsorptive but also have a high oil capacity.

Yet still another object of the present invention is to provide filters and a filter assembly for separating out oil from an oily liquid wherein each filter includes a plurality of feathers attached to a layer of sheet material and wherein each filter is not only retentive (i.e. displays minimal leakage upon saturation) but also is relatively low in cost and may be reused after the oil has been removed therefrom.

Yet a further object of the present invention is to provide a filtering system including a plurality of interconnected filtering devices for separating out oil from an oily liquid passed therethrough wherein a filter of each of the filtering devices includes a plurality of feathers attached to a layer of sheet material and wherein the layer of sheet material is substantially continuous and is folded around itself to form multiple overlapping layers of feather-covered sheet material.

In carrying out the above objects and other objects of the present invention, a filter for separating out oil from an oily liquid comprises a layer of sheet material, a plurality of feathers and an attachment means for attaching a layer of the feathers to the layer of sheet material. The feathers sorb the oil in the liquid upon contact therewith.

Further in carrying out the above objects and other objects of the present invention a filtering device for separating out oil from an oily liquid passed therethrough comprises an outer housing having an inlet port and an outlet port and a hollow inner member disposed within the housing and in communication with the inlet port. The member has a plurality of spaced apertures extending therethrough for communicating the oily liquid therethrough. The device also includes a filter which is positioned over the apertures. The filter comprises a layer of sheet material, a plurality of feathers and an attachment means for attaching at least one layer of the feathers to the layer of sheet material. The feathers of the filter sorb the oil in the liquid and the sheet material passes the rest of the liquid therethrough upon relative movement between the liquid and the filter, said liquid thereafter passing out the outlet port.

A filtering system constructed in accordance with the present invention comprises at least two interconnected filtering devices in fluid communication with each other. Each of the devices includes an outer housing having an inlet port and an outlet port and a hollow inner member disposed within the housing and in communication with the inlet port. The inner member has a plurality of spaced apertures extending therethrough for communicating the oily liquid therethrough. Each of the devices also includes a filter positioned over the apertures. The filter comprises a layer of sheet material, a plurality of feathers and an attachment means for attaching at least one layer of the feathers to a layer of the sheet material. The feathers of each of the filters sorb the oil in the liquid and the sheet material of each of the filters passes the rest of the liquid therethrough upon relative movement between the liquid and the filter of its respective device, said liquid thereafter passing out the outlet port of its respective housing.

A filter assembly for separating out oil from an oily liquid includes a conveyor mounted for movement relative to the liquid and a plurality of filters supported by the conveyor at spaced intervals thereon for movement therewith. Each of the filters comprises a layer of sheet material, a plurality of feathers and an attachment means for attaching a layer of the feathers to the layer of sheet material. The feathers sorb the oil in the liquid upon relative movement between the liquid and the conveyor.

Preferably, the layer of sheet material is substantially continuous and is wound around itself to form multiple overlapping layers of feather-covered sheet material.

The objects, features and advantages of the present invention are readily apparent from the following detailed description of the best mode for carrying out the invention taken in connection with the accompanying drawings.

BRIEF DESCRIPTION OF THE DRAWINGS

FIG. 1 is a perspective view illustrating a filter constructed in accordance with the present invention in its unfolded condition;

FIG. 2 is a perspective view of the filter of FIG. 1 after it has been wound around itself;

FIG. 3 is a sectional, side elevational view of a filtering device utilizing the filter of FIG. 2;

FIG. 4 is a view illustrating a filtering system including a plurality of fluidly interconnected filtering devices of FIG. 3;

BEST MODE FOR CARRYING OUT THE INVENTION

Figure 5:
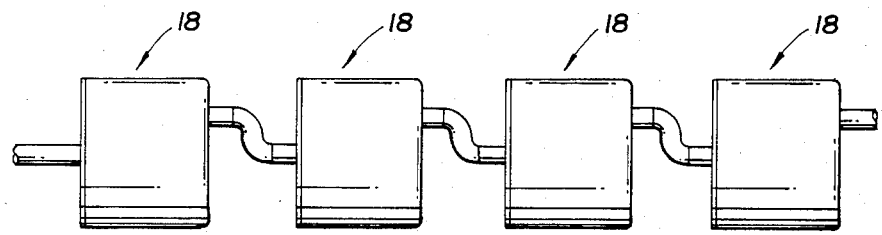
FIG. 5 is a view illustrating a filtering system including a plurality of filtering devices of FIG. 3 interconnected in series.

Referring now to FIG. 1, there is shown in its unfolded condition, a filter constructed in accordance with the present invention, at 10. The filter includes a layer of permeable sheet material which preferably comprises a plastic, flexible net 12. It is to be understood, however, that the net 12 may also be metallic.

A plurality of bird feathers 14, such as chicken or duck feathers, are attached to the net 12 by a glue or other quick-drying adhesive to both sides of the net 12. For example, the net 12 may be dipped in the glue and thereafter the feathers 14 may be blown against the net 12 on both sides thereof.

After the glue has at least partially dried on the net 12, the net 12 is rolled in a helical fashion to the cylindrical form shown in FIG. 2. The net 12 may be wound around about itself, as shown in FIG. 2, or, alternatively, as shown in FIG. 3, may be wound around about a hollow cylindrical member, generally indicated at 16 of a filtering device, generally indicated at 18. The hollow member 16 preferably comprises a perforated hollow metal or plastic cylinder, having a plurality of spaced apertures 20 extending therethrough. The hollow member 16 can also be inserted in the filter after it is wound.

The member 16 is supported within an outer plastic or metal housing, generally indicated at 22, including a top member 24 and a bottom member 26. The top member 24 includes an inlet port 28 for allowing the introduction of an oily liquid therethrough and into the hollow member 20. The bottom member 26 includes an outlet port 30 for allowing the filtered fluid to exit the filtering device 18. The housing 22 preferably holds anywhere between 50 to 100 gallons of oil which has been sorbed by the feathers 14.

The hollow member 16 is supported within the housing 22 between the top and bottom members 24 and 26, respectively, between flat, compressible seals 32. The top and bottom members 24 and 26, respectively, are removably held together in any well-known fashion to permit the removal of the filter 10 from the housing 22 when the filter 10 is saturated with oil. The filter 10 may thereafter be washed of oil by squeezing and/or air blowing and replaced within the housing, thereby allowing the oil to be recaptured for use. Alternatively, the filter may be installed and used as an oily base or combusted to provide a source of heat.

Referring now to FIG. 4 and FIG. 5, there are shown two different configurations or systems of fluidly interconnected filtering devices, such as the filtering device 18, for separating out oil from an oily liquid passed therethrough. As shown in FIG. 4, the uppermost filtering devices 18 are connected in parallel and the fluid communicated through each of the filtering devices 18 is controlled by inlet and outlet valves 34 and 36, respectively. The valves 34 and 36 permit the removal of a certain filter or filters from their respective housings without affecting the filtering operation performed by the other filtering devices.

Referring now to FIG. 5, a plurality of the filtering devices 18 are shown connected in series to perform successive stages of filtering. The system may be periodically shut down to replace those filters which are close to saturation. Also, during a shut-down the filters may be interchanged among the various devices.

Figure 6:
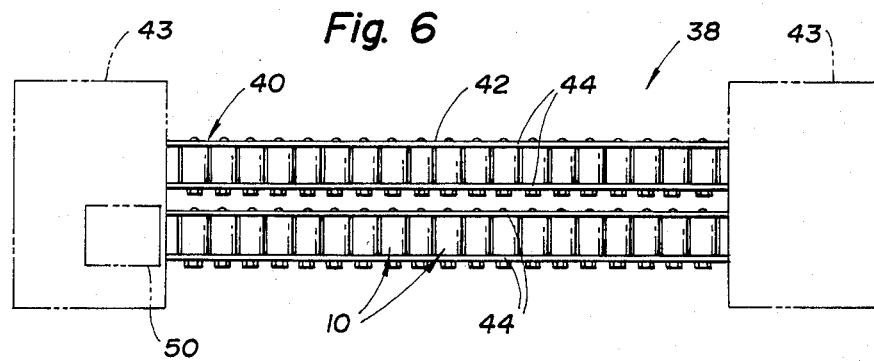
FIG. 6 is a view illustrating a filter assembly including a conveyor extending between a pair of structures for removing oil from a liquid body.
Figure 7:
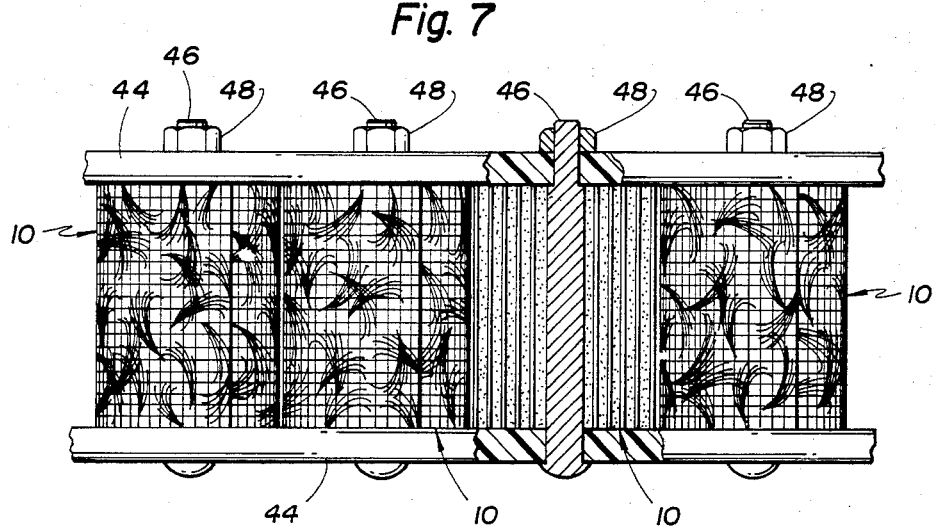
FIG. 7 is an enlarged view, partially broken away and in cross section, showing the interconnection of the filters to the conveyor of the assembly.

Referring now to FIG. 6 there is illustrated a filter assembly, generally indicated at 38, for separating oil from oily liquids, such as by removing an oil slick from the surface of a body of water. The assembly 38 includes a conveyor, generally indicated at 40, including an endless chain 42 which extends between a pair of structures 43 which may comprise a pair of boats or a boat and an underwater mechanism. The chain 42 includes a pair of cables 44 spaced apart by mounting bolts or supports 46 as best shown in FIG. 7. The mounting supports 46 are removably connected to the cables by nuts 48. In turn, a filter such as the filter 10 as shown in FIG. 2 is disposed about each mounting support 46 for sorbing the oil in the liquid upon movement of the conveyor chain 42 between the two structures 43. Onboard the boat structure 43 there is schematically shown a squeezing and drive mechanism at 50 for the chain 42 which may include a pair of rotating wheels to squeeze each of the filters 10 to release the sorbed oil contained therein. Such a squeezing mechanism is shown in the U.S. patent to Grutsch U.S. Pat. No. 3,608,727. Other such squeezing and drive mechanisms are well-known in the art and need not be described.

The invention has been described in an illustrative manner and it is to be understood that the terminology that has been used is intended to be in the nature of words of description rather than of limitation. Many modifications and variations of the present invention are possible in light of the above teachings. It is therefore to be understood that within the scope of the appended claims, the invention may be practiced otherwise than as specifically described.

What is claimed is:

1. A filtering device for separating out oil from an oily liquid passed therethrough, said device comprising:
   an outer housing having an inlet port and an outlet port;
   a hollow inner member disposed within said housing and in communication with said inlet port, said member having a plurality of spaced apertures extending therethrough for communicating said oily liquid therethrough; and
   a filter positioned over said apertures, said filter comprising:
   a layer of sheet material;
   a plurality of feathers; and
   attachment means for individually attaching each of said feathers in a fixed position on the layer of sheet material to form at least one layer of said feathers;
   wherein the feathers of said filter sorb the oil in the liquid and the sheet material passes the rest of the liquid therethrough upon relative movement between the liquid and the filter, said liquid thereafter passing out of the outlet port.

2. A filtering system for separating out oil from an oily liquid passed therethrough, said system comprising at least two interconnected filtering devices in fluid communication with each other, each of said devices comprising:
   an outer housing having an inlet port and an outlet port;
   a hollow inner member disposed within said housing and in communication with said inlet port, said member having a plurality of spaced apertures extending therethrough for communicating said oily liquid therethrough; and
   a filter positioned over said apertures, said filter comprising:
   a layer of sheet material;
   a plurality of feathers; and
   attachment means for individually attaching each of said feathers in a fixed position on the layer of sheet material to form at least one layer of said feathers,
   wherein the feathers of each of said filters sorb the oil in the liquid and the sheet material of each of said filters passes the rest of the liquid therethrough upon relative movement between the liquid and the filter of its respective device, said liquid thereafter passing out the outlet port of its respective housing.

3. The system as claimed in claim 2 wherein two of said filtering devices are connected in series.

4. The system as claimed in claim 2 or claim 3 wherein two of said filtering devices are connected in parallel.

5. The system as claimed in claim 4 including fluid control means for controlling the flow of fluid to at least one of said devices.

6. The system as claimed in claim 2 wherein said layer of sheet material is substantially continuous and is wound around itself to form multiple overlapping layers of feather-covered sheet material.

* * * * *